United States Patent Office 2,833,616
Patented May 6, 1958

2,833,616

SEPARATION OF URANIUM FROM ZIRCONIUM AND NIOBIUM BY SOLVENT EXTRACTION

Eugene E. Voiland, Richland, Wash., assignor to the United States of America as represented by the United States Atomic Energy Commission No Drawing. Application March 26, 1954
Serial No. 419,125

6 Claims. (Cl. 23—14.5)

This invention deals with a process for recovering uranium values from aqueous solutions by solvent extraction, and in particular with the separation of the uranium values from zirconium and/or niobium values contained in aqueous nitric acid soltuions.

When neutron-irradiated uranium fuel elements are processed for the purpose of recovering the various ingredients, they are usually first dissolved in nitric acid. In one process for recovery of the uranium, the plutonium and/or the fission products from such so-called dissolver solutions, extraction is carried out by contacting these solutions with an organic substantially water-immiscible solvent; by this the uranium (VI) and plutonium (IV) or (VI) values in nitric acid solutions are extracted, while the fission product values predominantly remain in the aqueous solution. However, there are some of the fission products which are coextracted with the uranium and the plutonium to a substantial degree, and the separation process is complicated by this phenomenon.

Of the fission products which cause such difficulties zirconium and niobium are especially troublesome. Thus, after extraction the aqueous waste solution conconium and niobium values and also a small amount of uranium, while the solvent extract phase contains zirconium and niobium together with the bulk of the plutonium and uranium. This solvent extract phase is then "scrubbed" with an aqueous salt solution in order to remove fission products that might have been extracted and then treated for selective back-extraction of the plutonium values, which is accomplished by contacting it with an aqueous solution of a reducing agent and a water-soluble nitrate as a salting-out agent. The reducing agent, for instance ferrous sulfamate, reduces the plutonium only and thereby converts it to the water-soluble trivalent state.

The solvent phase remaining after the selective back-extraction then still contains the uranium values together with the zirconium and niobium values that had been originally coextracted. The uranium values are recovered from the solvent extract phase, and the solvent is regenerated thereby, by contacting it with a dilute nitric acid solution; an aqueous so-called strip solution is obtained thereby which contains the uranium together with the zirconium and mobium values.

The process of this invention is applicable to the septains the bulk of the fission products, some of the zir-aration of the uranium values from zirconium and/or niobium values from dissolver solutions, from aqueous waste solutions and also from strip solutions of the type just described. Moreover, the process is suitable for processing ore solutions which contain uranium values together with zirconium values, such as acid solutions obtained in the treatment of monazite sand.

It is an object of this invention to provide a process for the separation of uranium values from aqueous solutions containing said values together with zirconium and/or niobium values by solvent extraction whereby the zirconium and niobium extraction is considerably reduced and separation is thus improved.

It is another object of this invention to provide a process for the separation of uranium values from aqueous solutions containing said values together with zirconium and/or niobium values by solvent extraction whereby practically all separation takes place in the extraction step so that scrubbing can be considerably reduced.

It is finally also an object of this invention to provide a process for the separation of uranium values from aqueous solutions containing said values together with zirconium and/or niobium values by solvent extraction whereby a relatively small part of the column only is necessary for scrubbing so that a greater part is available for extraction. This entails the possibility of an increased throughput and also a reduction of losses due to the contents still present in the waste solutions.

The objects of this invention are accomplished by adding phosphoric acid anions to the nitric acid solution containing the uranium, zirconium and/or niobium values to be separated, contacting the solution with an organic substantially water-immiscible solvent whereby the uranyl values are taken up by an extract phase while the zirconium and niobium values preferentially remain in an aqueous raffinate, and separating said extract phase from said aqueous raffinate.

The nitric acid concentration in the aqueous solution may vary widely; however, a centration of between 3 and 7 M has been found preferable. The amount of phosphoric acid added is advantageously chosen so that a concentration results of between 0.05 and 0.2 M. Concentrations of 0.06 M and of 0.18 M phosphoric acid, for instance, have given excellent results. However, a concentration of as low as 0.005 M has proven satisfactory if the solution with the phosphoric acid was allowed to stand for several days prior to extraction.

The improvement brought about by the addition of phosphoric acid takes place with any solvent. High degrees of separation, for instance, have been achieved with tributyl phosphate and with methyl isobutyl ketone (hexone). The types of solvents customarily employed for solvent extraction processes and operative for the process of this invention are broadly ethers, glycol ethers, esters, ketones, alcohols, alkyl phosphates, nitrohydrocarbons and alkyl sulfides. Some solvents which have a high viscosity are preferably used in the form of a mixture with a low-viscosity diluent.

As in all extraction processes, the addition of a so-called salting-out agent is also advantageous in the process of this invention. Salting-out agents are inorganic compounds which are highly soluble in water and which, when added in sufficient amounts to an aqueous salt solution to be extracted, promote the interchange of said salt into an organic solvent therefor. Water-soluble nitrates are the preferred salting-out agents for extraction from nitric acid-containing aqueous solutions.

The extraction may be carried out by the use of batch, continuous batch, batch countercurrent or continuous countercurrent methods, the latter being the preferred mode of operation. Continuous countercurrent extraction is usually carried out in columns in which the liquid of the greater density is introduced at, or near, the top and that of the lower density at the bottom of the column whereby the countercurrent flow is obtained automatically.

In the following, a few examples are given which illustrate the improvement brought about by the addition of phosphoric acid to the aqueous solution to be treated in the separation of uranium from zirconium and/or niobium.

EXAMPLE I

An aqueous solution obtained by dissolving neutron-irradiated uranium in nitric acid was equilibrated with a mixture of tributyl phosphate and kerosene in which the tributyl phosphate content was 30% by volume. The nitric acid concentration was varied in a number of runs, and two parallel experiments were always carried out, one with the aqueous solution as was and the other one after the addition of phosphoric acid thereto. The distribution coefficients (concentration in organic phase/concentration in aqueous phase) obtained for zirconium and niobium and the conditions for each experiment are given in Table I.

*Table I*

| $HNO_3$ Conc. Aq. phase M | $H_3PO_4$ Conc. Aq. phase M | U Conc. Org. phase M | Distribution Coefficient of— | |
|---|---|---|---|---|
| | | | Zr | Nb |
| 5.1 | | .85–.90 | $10^{-5}$ | $10^{-5}$ |
| 5.1 | 0.18 | .85–.90 | $10^{-2}$ | $10^{-3}$ |
| 6.6 | | .7 | $10^{-4}$ | $3 \times 10^{-4}$ |
| 6.6 | 0.18 | .7 | $10^{-3}$ | $5 \times 10^{-3}$ |
| 5.1 | | .7 | $5 \times 10^{-4}$ | $8 \times 10^{-5}$ |
| 5.1 | 0.18 | .7 | $10^{-3}$ | $4 \times 10^{-3}$ |
| 3.6 | | .7 | | $7 \times 10^{-5}$ |
| 3.6 | 0.18 | .7 | | $2 \times 10^{-3}$ |

The results show clearly how beneficial an effect the addition of phosphoric acid has on the separation of uranium from zirconium and niobium by solvent extraction.

EXAMPLE II

Another study was made using batch extraction also without scrubbing. Six experiments using feed solutions of three different nitric acid concentrations, each with and without the addition of phosphoric acid, were carried out. The feed solutions contained uranyl nitrate in a concentration of 0.58 M. The extractant was a mixture of 30% tributyl phosphate and 70% of a kerosene-type hydrocarbon diluent. The volume ratio of organic to aqueous was 3.25:2. In Table II the decontamination factors obtained in each instance are compiled. (The decontamination factor of zirconium, for instance, is the ratio of the initial concentration of zirconium in the feed per gram of uranium to the zirconium concentration per gram of uranium in the organic solvent extract.)

*Table II*

| Aqueous Feed | | Decontamination Factor of— | |
|---|---|---|---|
| $H_3PO_4$ M | $HNO_3$ M | Zr | Nb |
| 0 | 6.6 | 700 | 540 |
| 0 | 5.1 | 590 | 1,200 |
| 0 | 3.6 | 420 | 1,900 |
| 0.18 | 6.6 | 6,400 | $8.6 \times 10^4$ |
| 0.18 | 5.1 | 1,480 | $7.5 \times 10^4$ |
| 0.18 | 3.6 | ------ | $2.4 \times 10^4$ |

These experiments, too, proved the radical decrease of zirconium and niobium extraction when uranyl nitrate extraction is carried out from phosphoric acid-containing solutions.

EXAMPLE III

In another series of experiments a five-month-old dissolver solution was used which contained 300 grams uranium per liter and nitric acid in a concentration of 5.1 M. Two parallel experiments, I and II, were carried out without the addition of phosphoric acid, while for parallel experiments III and IV phosphoric acid had been added to the feed prior to extraction. Three scrubs were carried out countercurrently, the first two scrubs with 3 M nitric acid and the third scrub with an aqueous solution containing 30 grams uranium per liter. The solvent, also in this instance, was a mixture of 30% tributyl phosphate in a kerosene-type hydrocarbon. The ratio of the flow rates for feed:scrubs 1 plus 2:scrub 3:solvent was 0.6:0.22:0.2:1. The results are summarized in Table III.

*Table III*

| Exp't No. | I | II | III | IV |
|---|---|---|---|---|
| $H_3PO_4$, M | 0 | 0 | 0.18 | 0.18 |
| Gross γ D. F.[1]—after extn | 190 | 110 | $7 \times 10^4$ | $5 \times 10^4$ |
| after 1st scrub | 13 | 20 | 3.4 | 4 |
| after 2nd scrub | 10 | 9 | 1.4 | 1.6 |
| after 3rd scrub | 3 | 5 | 1.3 | 1.1 |
| c./m./ml. in final organic extract | $2.1 \times 10^4$ | $1 \times 10^4$ | $5.4 \times 10^3$ | $6.8 \times 10^3$ |
| Gross β D. F.—after extn | $2.5 \times 10^3$ | $2.3 \times 10^3$ | $1.2 \times 10^4$ | $.8 \times 10^4$ |
| after 1st scrub | 19 | 23 | 15 | 22 |
| after 2nd scrub | 7.5 | 7 | 2.5 | 1.5 |
| after 3rd scrub | 2 | 2 | 1 | 1 |
| c./m./ml. in final organic extract | $1.8 \times 10^3$ | $1.7 \times 10^3$ | $4.2 \times 10^3$ | $6.1 \times 10^3$ |
| Zr D. F.—after extn | 50 | 43 | $>\times 10^4$ | $>\times 10^4$ |
| after 1st scrub | 17 | 21 | ------ | ------ |
| after 2nd scrub | 12 | 9 | ------ | ------ |
| after 3rd scrub | 5 | 7 | ------ | ------ |
| c./m./ml. in final organic extract | $1 \times 10^4$ | $.8 \times 10^4$ | ------ | ------ |

[1] D. F.=Decontamination factor.

These experiments are another good illustration of the beneficial effect of phosphoric acid on the uranium separation from zirconium and niobium values. They also show that in the presence of phosphoric acid all decontamination takes place in the extraction step and that by the various scrubbing steps hardly any further decontamination is accomplished. This is more pronounced in regard to the gamma- than to the beta-emitting fission products. Thus, scrubbing can be considerably reduced as compared with the stages used heretofore, and a greater percentage of the column can be devoted to extraction proper. By this a lower uranium loss in the waste and a greater throughput are made possible.

If the ratios of gross gamma to gross beta counts obtained without phosphoric acid are compared with those obtained with phosphoric acid, the radical reduction accomplished by the presence of phosphoric acid will be obvious. The ratios in the case of no phosphoric acid are 12 and 6, respectively in experiments I and II, while in the case of phosphoric acid they are close to unity. This, however, does not indicate the presence of considerable amounts of zirconium and/or niobium, since these gamma counts are mostly caused by the presence of $Ru^{103}$ in the dissolver solutions.

EXAMPLE IV

A dissolver feed solution, containing uranyl nitrate hexahydrate in a concentration of 2.0 M, sodium dichromate in a concentration of 0.1 M, sodium nitrate in a concentration of 0.38 M and being 0.2 M deficient in nitric acid, was made 0.005 M in phosphoric acid and allowed to stand for 15 days. This solution was then extracted countercurrently in an extraction column with hexone 0.2 M in nitric acid and then scrubbed with an aqueous 0.2 M acid-deficient solution containing aluminum nitrate nonahydrate in a concentration of 1.8 M, sodium dichromate in a concentration of 0.1 M and sodium nitrate in a concentration of 0.2 M. The relative flow rates of feed:solvent:scrub solutions were 1:4:1. Another experiment was carried out under identical conditions with the exception that the feed solution did not contain phosphoric acid.

Comparison of the decontamination factors in both instances showed that by the presence of phosphoric acid the decontamination factor of zirconium was improved by a factor of 5.9 and that of niobium by a factor of 35.

It will be understood that this invention is not to be limited to the details given herein but that it may be modified within the scope of the appended claims.

What is claimed is:

1. A process of extracting uranium values from an aqueous nitric acid solution containing the uranium together with zirconium and niobium values comprising adding phosphoric acid anions to said aqueous solution in a quantity to yield a concentration of between 0.005 and 0.2 M, contacting said aqueous solution with an organic substantially water-immiscible solvent whereby said uranyl values are taken up by an extract phase while said zirconium and niobium values remain in an aqueous raffinate, and separating said extract phase from said aqueous raffinate.

2. The process of claim 1 wherein the phosphoric acid anions content is about 0.005 M and the solution containing it is allowed to stand for several days prior to extraction.

3. The process of claim 1 wherein the concentration is between 0.05 and 0.2 M.

4. The process of claim 1 wherein the solvent is tributyl phosphate.

5. The process of claim 1 wherein the solvent is hexone.

6. A process of extracting uranium values from an aqueous nitric acid solution containing the uranium together with zirconium values comprising adding phosphoric acid anions to said aqueous solution in a quantity to yield a concentration of between 0.005 and 0.2 M, contacting said aqueous solution with an organic substantially water-immiscible solvent whereby said uranyl values are taken up by an extract phase while said zirconium values remain in an aqueous raffinate, and separating said extract phase from said aqueous raffinate.

References Cited in the file of this patent

Warf: U. S. Atomic Energy Comm. declassified paper No. AECD–2524, declassified, Mar. 11, 1949, 10 pages.

UNITED STATES PATENT OFFICE
CERTIFICATE OF CORRECTION

Patent No. 2,833,616                                                    May 6, 1958

Eugene E. Voiland

It is hereby certified that error appears in the printed specification of the above numbered patent requiring correction and that the said Letters Patent should read as corrected below.

Column 1, line 38, after the syllable "con-" insert -- tains the bulk of the fission products, some of the zir- --; line 60, for "mobium" read -- niobium --; line 62, strike out "tains the bulk of the fission products, some of the zir-"; column 2, line 31, for "centration" read --concentration--.

Signed and sealed this 19th day of May 1959.

(SEAL)
Attest:

KARL H. AXLINE
Attesting Officer

ROBERT C. WATSON
Commissioner of Patents